United States Patent
Lee

(10) Patent No.: US 7,699,067 B2
(45) Date of Patent: Apr. 20, 2010

(54) CLAMPING APPARATUS FOR WASHING OPTICAL MEMBERS

(75) Inventor: Hsin-Ho Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 881 days.

(21) Appl. No.: 11/309,700

(22) Filed: Sep. 15, 2006

(65) Prior Publication Data

US 2007/0125724 A1   Jun. 7, 2007

(30) Foreign Application Priority Data

Dec. 2, 2005   (CN) .................. 2005 1 0102015

(51) Int. Cl.
*B08B 3/04* (2006.01)
(52) U.S. Cl. .................. 134/135; 134/902; 211/41.18
(58) Field of Classification Search .................. 134/135, 134/902; 411/41.17, 41.18
See application file for complete search history.

(56) References Cited

U.S. PATENT DOCUMENTS

| | | | | |
|---|---|---|---|---|
| 1,661,378 A | * | 3/1928 | McKellar ..................... | 396/651 |
| 3,135,388 A | * | 6/1964 | Lang ............................. | 211/10 |
| 3,534,862 A | * | 10/1970 | Shambelan ............... | 211/41.18 |
| 3,665,790 A | * | 5/1972 | Jones ......................... | 294/99.2 |
| 3,826,377 A | * | 7/1974 | Bachmann ............... | 211/41.18 |
| 4,023,691 A | * | 5/1977 | Perel .......................... | 414/810 |
| 4,493,418 A | * | 1/1985 | Johnson ..................... | 206/454 |
| 5,111,936 A | * | 5/1992 | Kos ......................... | 211/41.18 |
| 5,170,893 A | * | 12/1992 | Smith .......................... | 211/40 |
| 5,538,230 A | * | 7/1996 | Sibley ........................ | 269/296 |
| 5,824,119 A | * | 10/1998 | Takeuchi ................... | 29/25.01 |
| 6,014,817 A | * | 1/2000 | Thompson et al. ............. | 34/60 |
| 6,036,031 A | * | 3/2000 | Ishikawa ................. | 211/41.18 |
| 6,502,692 B1 | * | 1/2003 | Gentle ....................... | 206/0.83 |

FOREIGN PATENT DOCUMENTS

| | | | |
|---|---|---|---|
| CN | 68100724 | A | 8/1988 |
| JP | 58-207651 | * | 12/1983 |
| JP | 61-097836 | * | 5/1986 |
| JP | 61-214512 | * | 9/1986 |
| JP | 05-221521 | * | 8/1993 |
| JP | 6-183469 | A | 7/1994 |
| JP | 06-291111 | * | 10/1994 |
| JP | 2000-196180 | * | 7/2000 |
| JP | 2001-192085 | * | 7/2001 |
| JP | 2003-190901 | * | 7/2003 |

OTHER PUBLICATIONS

WIPO 2005/091039 Sep. 2005.*
IBM Technical Disclosure Bulletin, vol. 24, Nov. 1981.*
IBM Technical Disclosure Bullentin, vol. 33, Mar. 1991.*

* cited by examiner

*Primary Examiner*—Frankie L Stinson
(74) *Attorney, Agent, or Firm*—Steven M. Reiss

(57) ABSTRACT

An exemplary clamping apparatus (10) for optical members (50) includes a base (11) and a positioning frame (13). The base has a plurality of receiving grooves (122) defined therein. Each receiving groove is configured for receiving one optical member therein. The positioning frame is mounted on the base. The positioning frame has a cavity (132) defined therein for receiving the optical members.

14 Claims, 5 Drawing Sheets ived in a clamping apparatus in accordance
CLAMPING APPARATUS FOR WASHING OPTICAL MEMBERS

1. FIELD OF THE INVENTION

The present invention generally relates to clamping apparatuses and, more particularly, to a clamping apparatus configured for washing optical members such as optical lenses, optical filters, or the like.

2. DESCRIPTION OF RELATED ART

With the ongoing development of micro-circuitry and multimedia technologies, digital cameras have become a highly popular way of taking pictures. High-end portable electronic devices, such as mobile phones and personal digital assistants (PDAs), are being developed to include increasing numbers of special features. Many of these portable electronic devices are now equipped with a digital camera module, these electronic devices enable consumers to enjoy capturing digital pictures anytime and anywhere, the smallest and most eye-catching cameras being the most popular.

In camera modules, optical lenses are very important to the quality of the pictures captured by the camera modules. In a typical manufacturing process, the optical lenses are bonded together by ultraviolet glue and are ground to be round using a grinding machine. After being ground, the optical lenses need to be separated from each other by dissolving the ultraviolet glue and need to be washed before applying a film thereon.

Generally, optical lenses are first washed to dissolve the ultraviolet glue. Then the separated optical lenses are washed with ultrasonic waves in a vessel filled with liquid. The optical lenses are prone to collide with each other under the influence of the ultrasonic waves. As a result, a surface of each optical lens may easily be scraped or damaged. Therefore, optical lenses need to be fixed in a clamping apparatus manually so that the optical lenses are separated from each other and do not collide with each other. However, this process is time-consuming.

Therefore, a new clamping apparatus is desired in order to overcome the above-described shortcomings.

SUMMARY OF THE INVENTION

In one embodiment thereof, a clamping apparatus for washing optical members includes a base and a positioning frame. The base has a plurality of receiving grooves defined therein. Each receiving groove is configured for receiving one optical member therein. The positioning frame is mounted on the base. The positioning frame has a cavity defined therein for receiving the optical members.

Other advantages and novel features of the embodiments will become more apparent from the following detailed description thereof when taken in conjunction with the accompanying drawings.

BRIEF DESCRIPTION OF THE DRAWINGS

Many aspects of the present clamping apparatus can be better understood with reference to the following drawings. The components in the drawings are not necessarily drawn to scale, the emphasis instead being placed upon clearly illustrating the principles of the clamping apparatus and its potential applications. Moreover, in the drawings, like reference numerals designate corresponding parts throughout the several views.

DETAILED DESCRIPTION OF THE EMBODIMENTS

Figure 1:
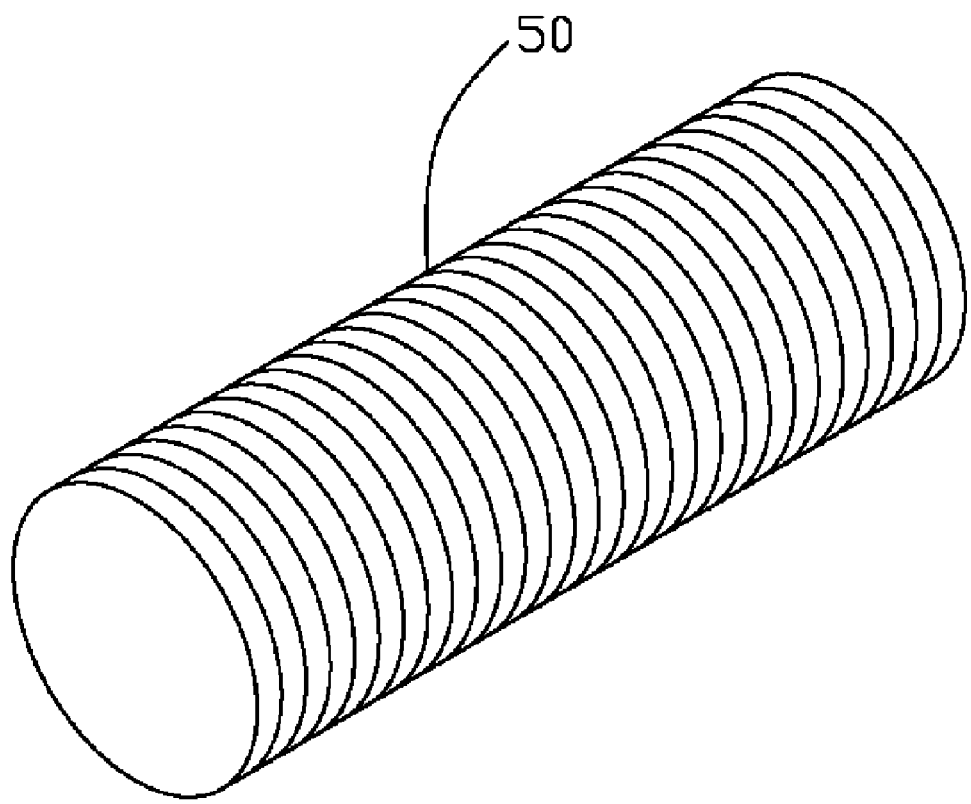
FIG. 1 is an isometric view of a plurality of optical members to be received in a clamping apparatus in accordance with a first preferred embodiment.
Figure 2:
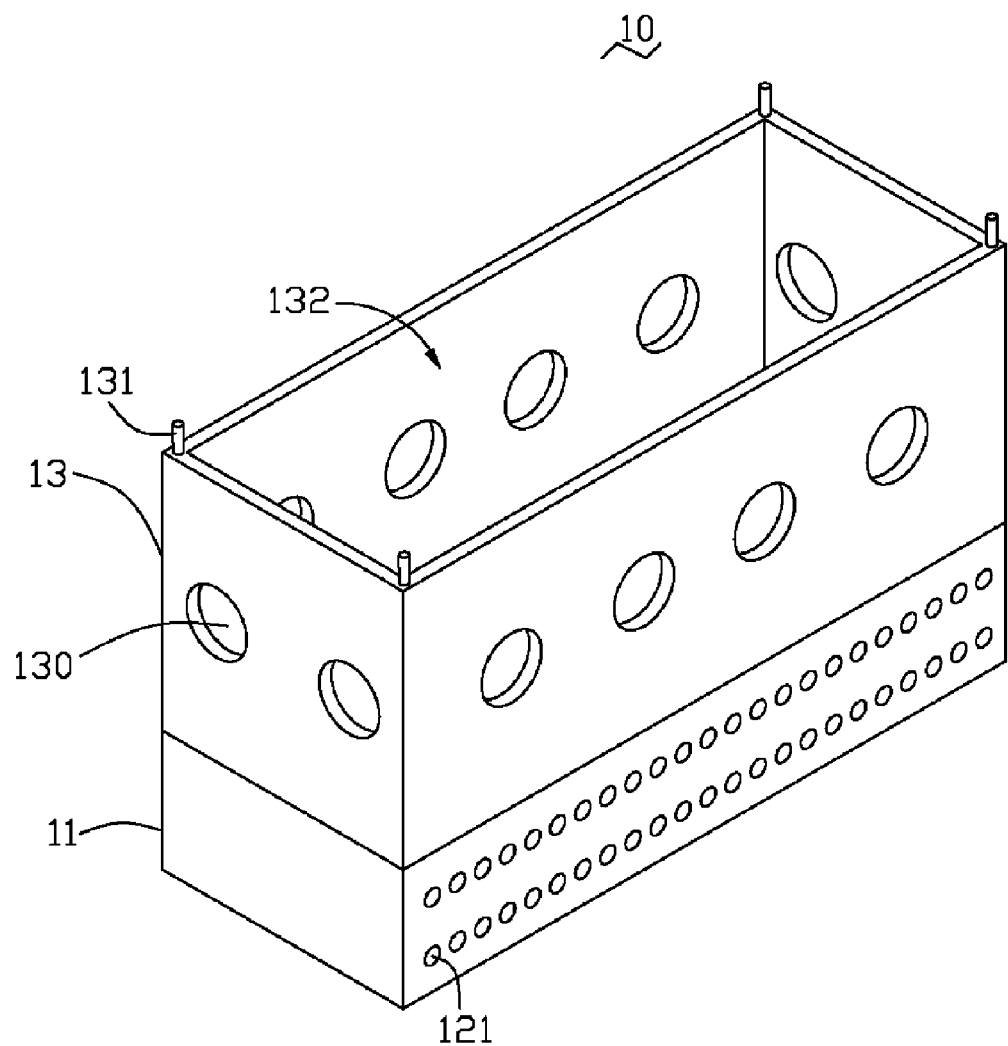
FIG. 2 is an assembled, isometric view of the clamping apparatus.

Referring now to the drawings in detail, FIGS. 1-2 show a clamping apparatus 10 of a first preferred embodiment of the present invention. The clamping apparatus 10 is capable of washing a plurality of optical members 50 at once. The optical members 50 may be optical lenses, optical filters, and the like. The clamping apparatus 10 includes a base 11 and a positioning frame 13. The positioning frame 13 is mounted on the base 11.

Figure 3:
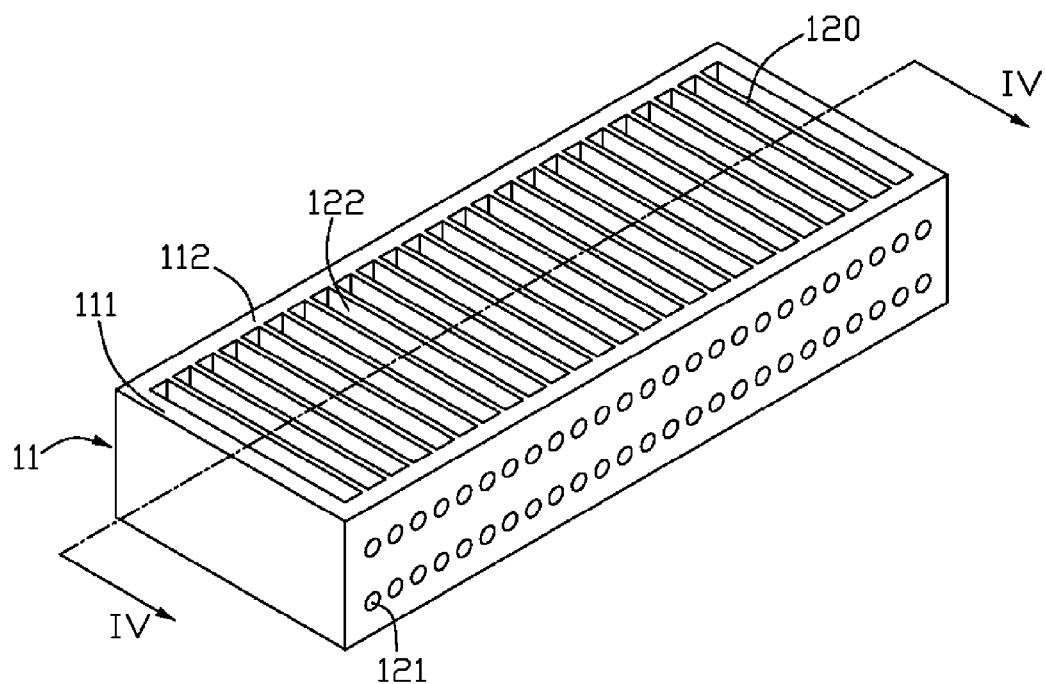
FIG. 3 is an enlarged, isometric view of a base of the clamping apparatus shown in FIG. 2.
Figure 4:
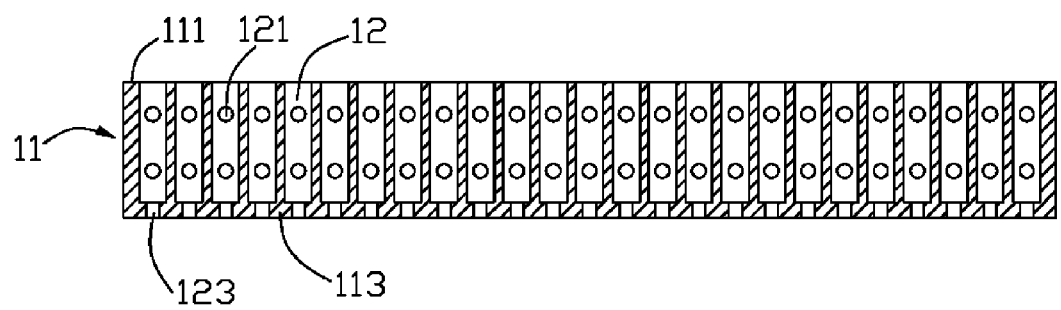
FIG. 4 is a cut-away view of the base of the clamping apparatus along line IV-IV in FIG. 3.

Also referring to FIGS. 3-4, the base 11 includes two parallel shorter sidewalls 111, two parallel longer sidewalls 112, and a bottom board 113. The shorter sidewalls 111, the longer sidewalls 112, and the bottom board 113 cooperate to define a rectangular cavity. A plurality of spacers 120 are received in the cavity thereby dividing the cavity into a plurality of receiving grooves 122. Each spacer 120 is a substantially thin board in shape and is oriented so as to be aligned parallel to the shorter sidewall 111. A length of the receiving groove 122 is substantially equal to a diameter of the optical member 50. A height of the receiving groove 122 is substantially equal to or more than a radius of the optical member 50. A thickness of the receiving groove 122 is substantially equal to a thickness of the optical member 50. The receiving groove 122 is configured (i.e., structured and arranged) for receiving one optical member 50. A plurality of side holes 121 are defined through the longer sidewalls 112. A plurality of bottom holes 123 are defined through the bottom board 113.

Further referring to FIG. 2, the positioning frame 13 has four rectangular sidewalls. The four sidewalls cooperate to define a cavity 132. The cavity 132 is configured for receiving the plurality of optical members 50. A plurality of circular holes 130 are defined through the sidewalls of the positioning frame 13. A pole 131 extends from each corner of the positioning frame 13. Each corner of the bottom board 113 of the base 11 defines a receiving hole therein. The pole 131 is configured for being received in the receiving hole of the base 11. One clamping apparatus 10 can be mounted on another clamping apparatus 10 through the engagement of the poles 131 and the receiving holes of the base 11. Thus a plurality of clamping apparatuses 10 can be stacked together for washing multiple optical members 50 at the same time.

In use, the positioning frame 13 is mounted on the base 11. The sidewalls of the positioning frame 13 are mounted on the sidewalls 111, 112 of the base 11. The cavity 132 of the positioning frame 13 communicates with the cavity of the base 11. In manufacturing process, the optical members are bonded together using ultraviolet glue and are ground to be round by a grinding machine. After being ground the optical members 50 are still bonded together by ultraviolet glue. Therefore, the optical members 50 are placed into the cavity 132 of the positioning frame 13 to dissolve the ultraviolet glue. The clamping apparatus 10 is placed into a washing vessel and the optical members 50 are washed with water or other washing liquid. The water flows through the circular holes 130 of the positioning frame 13 and the through holes 121, 123 of the base 11. After the ultraviolet glue is dissolved, the optical members 50 are separated from each other. Each optical member 50 can slide into one corresponding receiving groove 122 of the base 11 due to gravity.

Figure 5:
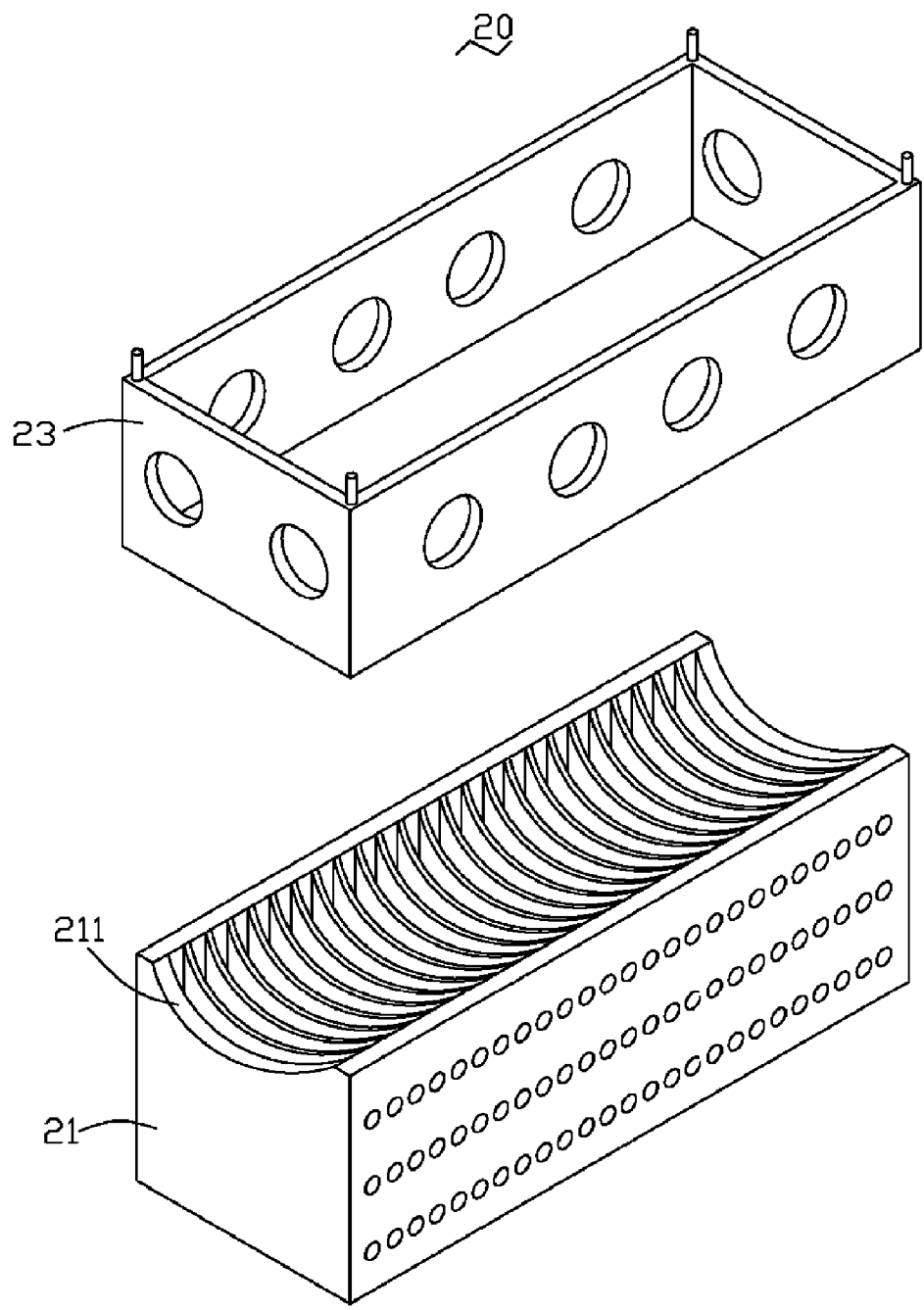
FIG. 5 is an exploded, isometric view of a clamping apparatus in accordance with a second preferred embodiment.

Also referring to FIG. 5, a clamping apparatus 20 in accordance with a second preferred embodiment is represented. The clamping apparatus 20 includes a base 21 and a positioning frame 23. The base 21 and the positioning frame 23 are similar to the base 11 and the positioning frame 13 of the clamping apparatus 10 except that the base 21 has two sidewalls 211 and a plurality of spacers 22. Each sidewall 211 defines an arched opening in a top end thereof. Each spacer 22 defines an arched opening in a top end thereof. The openings can be used to carry the optical members 50 from the base 21.

It is to be understood that the shorter sidewalls 111 and the spacers 120 may define a plurality of through holes such that the washing liquid may flow rapidly through the clamping apparatus 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clamping apparatus for washing and separating integrally bonded optical members into a plurality of separate optical members, comprising:
   a base having a plurality of receiving grooves defined therein, each receiving groove being configured for receiving one optical member therein; and
   a positioning frame mounted on the base and defining therein a cavity configured for receiving the integrally bonded optical members, the cavity being in communication with each of the receiving grooves, the integrally bonded optical members positioned by the positioning frame on the base, out of the plurality of the receiving grooves, so that the integrally bonded optical members can be separated from each other to slide into a corresponding one of the receiving grooves during washing.

2. The clamping apparatus as claimed in claim 1, wherein the base includes two parallel shorter sidewalls, two parallel longer sidewalls, and a bottom board, and the shorter sidewalls, the longer sidewalls, and the bottom board cooperate to define a rectangular cavity.

3. The clamping apparatus as claimed in claim 2, wherein a plurality of spacers are received in the cavity of the base thereby dividing the cavity into the plurality of receiving grooves.

4. The clamping apparatus as claimed in claim 3, wherein the spacer is a substantially thin board in shape and is oriented so as to be aligned parallel to the shorter sidewall.

5. The clamping apparatus as claimed in claim 3, wherein the spacer defines an arched opening in a top end thereof.

6. The clamping apparatus as claimed in claim 2, wherein the longer sidewalls define a plurality of side holes therethrough.

7. The clamping apparatus as claimed in claim 2, wherein the bottom board defines a plurality of bottom holes therethrough.

8. The clamping apparatus as claimed in claim 2, wherein the shorter sidewall of the base defines an arched opening in a top end thereof.

9. The clamping apparatus as claimed in claim 1, wherein a length of the receiving groove is substantially equal to a diameter of the optical member.

10. The clamping apparatus as claimed in claim 1, wherein a height of the receiving groove is substantially equal to or more than a radius of the optical member.

11. The clamping apparatus as claimed in claim 1, wherein a thickness of the receiving groove is substantially equal to a thickness of the optical member.

12. The clamping apparatus as claimed in claim 1, wherein the positioning frame has four rectangular sidewalls, and the four sidewalls cooperate to define the cavity.

13. The clamping apparatus as claimed in claim 12, wherein the sidewalls of the positioning frame defines a plurality of circular holes therethrough.

14. The clamping apparatus as claimed in claim 1, wherein a pole extends from each corner of the positioning frame, each corner of the base defines a receiving hole therein, and the pole is configured for being received in the receiving hole of the base.

* * * * *